No. 873,986. PATENTED DEC. 17, 1907.
B. F. BROWN.
HAND CART.
APPLICATION FILED AUG. 8, 1906.

WITNESSES:
M. J. Marty
Chas. F. Bassett

INVENTOR
B. F. Brown
BY Frederick Benjamin
ATTY.

UNITED STATES PATENT OFFICE.

BENJAMIN F. BROWN, OF BRIDGETON, INDIANA.

HAND-CART.

No. 873,986.

Specification of Letters Patent.

Patented Dec. 17, 1907.

Application filed August 8, 1906. Serial No. 329,657.

*To all whom it may concern:*

Be it known that I, BENJAMIN F. BROWN, citizen of the United States, residing at Bridgeton, in the county of Parke and State of Indiana, have invented certain new and useful Improvements in Hand-Carts, of which the following is a specification.

This invention relates especially to improvements in hand operated dump carts, but with slight modifications in details, the same principles of construction may be employed in carts drawn by horses.

The chief objects of my improvements are economy in the construction of the cart, simplicity in its operation, and quick and effective dumping of the contents.

Figure 1:
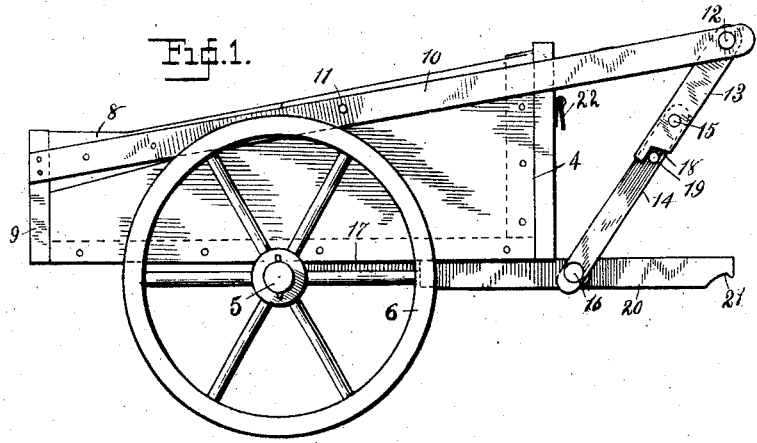
Figure 2:
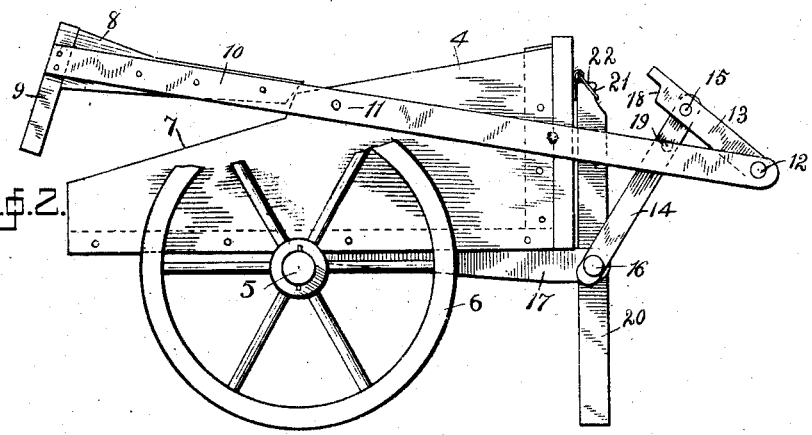
Figure 3:
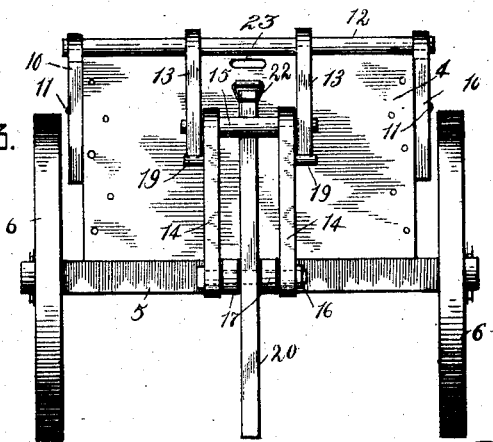

In the accompanying drawing I have shown a preferred adaptation of my invention in the following views:—Figure 1 is a side elevation of a cart in a loaded position; Fig. 2 is a side elevation showing the cart in its semi-dumping position, and Fig. 3 is a front elevation of the cart in its position of rest.

Referring to the details of the drawing, 4 represents the cart body or box, which is made up of a bottom, a front and two side pieces rigidly secured together. The side members slope downwardly from their front ends, and are cut away at the rear portions as at 7. This box is secured to an axle 5 which is placed slightly to the rear of the center and has ground-wheels 6 mounted on its spindles.

8 represents angular pieces which are fitted to the cut-away portions 7 of the side members, and at their rear ends are rigidly secured to the end-gate 9 which extends across the rear of the box. The angular pieces and the end-gate are bolted to the rear portion of side-bar levers 10, which are pivoted at 11 to the outer face of the sides of the box and extend forwardly so as to project beyond the front end of the box as shown. These levers are connected at their forward ends by a cross-bar 12 which serves as a handle in the operation of the cart.

Pivotally mounted on the bar 12 are two links 13, the lower ends of which are notched as at 18 to engage pins 19 which project at right angles from other links 14. The links 14 are pivoted at their upper ends on the links 13 by pivots 15 and at their lower ends are hinged on a bolt 16 which extends through the parallel pieces 17 which are rigidly secured to the under side of the wagon box and project beyond the front end of same. A leg 20 is pivoted on the bolt 16, and is notched at its upper end 21, to receive a link 22 which is hingedly connected with the front of the box. A hand-hole 23 is cut in the end of the box to facilitate the raising of the latter when it is desired to tilt the box. As the portion of the leg on the notched side of the bolt 16 is slightly longer than the other portion, when the leg is released from the link 22, gravity will cause the leg to assume the horizontal position shown in Fig. 1.

In dumping the contents of a cart constructed as described, the operator by pressing inwardly on the links, will break the joint therebetween, whereupon, by bearing down on the handle, the end-gate and the side pieces 8 will be raised thus permitting a portion of the contents to fall. The dumping operation will be completed by grasping the front of the box at the hand-hole 23, and tilting the box on its axis represented by the axle 5.

I have illustrated the various parts of my cart as made of wood in simple forms or designs, but it will be apparent that the parts may be made of metal and when so made will be given different shapes.

I claim as new and desire to secure by Letters Patent, the following:—

1. In a dump-cart, a box having suitable axle and wheels, the sides of the box having cut-away portions, pieces fitted to said cut-away portions, an end-gate for said box, levers secured to said pieces and end-gate, and pivoted on the sides of the box, and means for locking said levers against pivotal movement.

2. In a dump-cart, a box having suitable axle and wheels, an end-gate for said box, levers secured to said end-gate and pivoted on the sides of the box, and means for locking said members against pivotal movement, said means consisting of interlocking pivoted links connected with the levers and with the box, substantially as described.

3. In a dump-cart, a box having suitable axle and wheels, an end-gate for said box, levers secured to said end-gate and pivoted on the sides of the box, interlocking means for holding the levers against pivotal movement, said means adapted to be manually released, a leg hinged on said box and means for holding the leg in operative position.

In testimony whereof I affix my signature in presence of two witnesses.

BENJAMIN F. BROWN.

Witnesses:
  E. T. WELCH,
  JAMES DAVIS.